United States Patent [19]
Barry

[11] Patent Number: 6,152,585
[45] Date of Patent: Nov. 28, 2000

[54] ILLUMINATION DEVICE FOR MOTORIZED TWO WHEEL VEHICLES

[76] Inventor: James Barry, 5400 NW. 10th Ter., Fort Lauderdale, Fla. 33309

[21] Appl. No.: 09/156,234

[22] Filed: Sep. 18, 1998

[51] Int. Cl.[7] .................................. B60Q 1/00; B62J 6/02
[52] U.S. Cl. ......................... 362/473; 362/475; 362/474; 362/416
[58] Field of Search ..................... 362/496, 473, 362/540, 487, 509, 516, 307, 310, 311, 364, 365, 474, 475

[56] References Cited

U.S. PATENT DOCUMENTS

| | | |
|---|---|---|
| 1,337,872 | 4/1920 | Zahnow . |
| 2,891,140 | 6/1959 | Huff . |
| 3,358,135 | 12/1967 | Weismantel . |
| 3,987,294 | 10/1976 | Carlson . |
| 4,000,573 | 1/1977 | Cohen . |
| 4,320,906 | 3/1982 | Saunders, IV . |
| 4,515,405 | 5/1985 | Ogishima . |
| 4,557,517 | 12/1985 | Bolduc et al. . |
| 4,559,516 | 12/1985 | Schott et al. . |
| 4,779,169 | 10/1988 | Cruze . |
| 4,875,142 | 10/1989 | Spector . |
| 4,901,209 | 2/1990 | Nitz . |
| 5,247,431 | 9/1993 | Liu . |
| 5,406,465 | 4/1995 | Farchione . |
| 5,479,324 | 12/1995 | Barry . |
| 5,508,478 | 4/1996 | Barry . |
| 5,561,414 | 10/1996 | Chin ........................................ 362/473 |
| 5,615,940 | 4/1997 | Barry . |
| 5,634,706 | 6/1997 | Barry . |
| 5,669,698 | 9/1997 | Veldman ................................ 362/496 |
| 5,709,453 | 1/1998 | Krent et al. ............................ 362/496 |

FOREIGN PATENT DOCUMENTS 469692   7/1937   United Kingdom .

*Primary Examiner*—Thomas M. Sember
*Attorney, Agent, or Firm*—Malin, Haley & DiMaggio, P.A.

[57] ABSTRACT

An illumination device is provided and associated with the gas tank of a motorcycle to help illuminate the area in front and to the sides of the motorcycle. The device includes a light panel and a light housing. The light housing is provided with a reflective surface area which reflects light received from a light bulb in the direction in front of the motorcycle and to the side of the motorcycle corresponding to the side of the motorcycle to which the tank is attached.

25 Claims, 4 Drawing Sheets

ILLUMINATION DEVICE FOR MOTORIZED TWO WHEEL VEHICLES

BACKGROUND OF THE INVENTION

1. Field of the Invention

The present invention relates generally to motorcycles and more particularly to installing illumination means approximate the gasoline tank area of a motorcycle to increase the visibility of the motorcycle, as well as the rider's visibility of the surroundings, during nighttime conditions.

2. Description of the Prior Art

One problem which has continuously plagued motorcyclist is the visibility of the motorcycle while riding especially during night travel. This problem is further emphasized by the fact that many motorcyclist wear dark clothing when riding. Thus, many accidents involving motorcycles are the result of the participant failing to recognize the motorcycle and its rider(s). As the motorcycle itself provides minimal, if any, protection to the motorcyclist, many accidents involving motorcycles result in serious bodily injury or even death to the motorcyclist. Such severe consequences often occur even at relatively low traveling speeds.

Despite poor visibility of the motorcycle during nighttime travel, many motorcyclists still remove or disconnect the turn signals from their respective motorcycles. These riders feel that the signals take away from the aesthetic features of the motorcycles, as well as their own individuality. Thus, frequently no indication is given to other vehicles on the road when these motorcyclists are preparing to turn or switch lanes, which often results in unnecessary accidents.

Conventional motorcycle headlights merely illuminate the area approximately twenty-five (25) feet ahead of the motorcycle. Thus, the rider is normally not aware of the surface conditions on either side of the motorcycle or directly in front of the motorcycle. Several problems immediately become apparent from the lack of illumination around the motorcycle, including the inability to detect glass, sand, potholes, water, loose gravel, pieces of tires, oil, rocks or other items and obstacles which may be disposed on the surface to which the rider is approaching or is about to turn onto. As such, serious injuries may occur which may have been prevented by improved or proper illumination around the motorcycle.

Thus, what is needed in the art is a device or apparatus that allows for better illumination and visibility of the motorcycle, as well as for the rider of the motorcycle, during night traveling. In addition, the device must be safe and not increase the chance of serious injury. Given, the artistic beauty of certain motorcycles, the device must not detract or interfere with the natural aesthetic features of the motorcycle. In fact, it is desirable that the device actually increase or highlight such aesthetics. It is, therefore, to the effective resolution of the aforementioned problems and shortcomings that the present invention is directed.

SUMMARY OF THE INVENTION

Generally, the invention relates to providing one or more illumination devices adjacent a gasoline tank of a motorized two wheel vehicle, and preferably a motorcycle. The illumination device can incorporate solid or flashing lights, and can be used as substitute turn signals.

In the first embodiment, the illumination device preferably includes a light panel which is associated with a light housing, having a light element disposed within. The wiring for the element is preferably wired to the existing circuitry, battery, turn signals, etc. of the motorcycle for powering the light element. Alternatively, an additional battery can be provided for powering the light element. The light housing is preferably provided with a reflective inner surface and a portion of its body member is curved shape for aiding in directing the reflecting light toward its desired location.

The light panel is preferably attached to the motorcycle frame, and preferably is attached by at least one of the same bolts which attach the gas tank or shell to the motorcycle frame. Depending on the motorcycle, an extension member may be necessary to reach one or more of the bolt locations. The extension member can be constructed integral with the light panel or the light panel can be attached to the extension member by conventional means such as connectors, fasteners, bolts, screws, adhesives, tapes, hook and loop fasteners, etc.

Preferably, the contour or the light panel corresponds to the contour of the gasoline tank or shell, such that when the light panel is attached it preferably appears as part or a continuation of the tank or shell. In lieu of attaching by the above-mentioned ways, the panel can be attached by other conventional methods such as adhesives, tapes, hook and loop fasteners, etc., as well as other bolts, screws, fasteners and connectors attached to other areas of the motorcycle.

Preferably, a portion of the light panel is cutout or made transparent or otherwise light transmissive, adjacent the portion of the panel where the light housing and associated light element are disposed. Preferably, the light housing is attached to the light panel by conventional means, such as adhesives, tapes, hook and loop fasteners, screws, bolts, fasteners, connectors, etc. Alternatively, the light housing can be attached directly to the gas tank or shell by similar conventional means.

A lens or other light transmissive material is attached to the light housing and disposed adjacent to or within the cutout or other relevant area of the panel, for allowing light generated by the light bulb to be reflected through the panel to illuminate a substantial portion of the area surrounding the motorcycle, as well as otherwise making the motorcycle more visible during nighttime travel. A portion of the lens can be differing in color then the remaining portion of the lens. The lens, cutout or other light transmissive area can be provided at any portion of the light panel. Preferably, the lens is provided towards the front of the panel or front side area of the panel, when the light panel is properly attached to the motorcycle.

It is also within the scope of the invention to provide more than one cutout or lens with each light panel. Where a plurality of cutouts or lenses are provided, a single illumination member (light housing and light element), sufficient enough to provide adequate light through all cutouts or lenses can be provided. Alternatively, each cutout or lens can be associated with its own corresponding illumination member.

Thus, the illumination device lights the side and front areas adjacent the motorcycle to allow the rider to have better familiarity with the surroundings during nighttime travel.

In all embodiments the original shape of the gasoline tank or shell is not altered. Whether attached thereto or formed integral therewith, the light panel merely appears as a natural extension of the gasoline tank or shell. Therefore, the motorcycle retains its original look and aesthetics.

It is an object of the present invention to enhance the visibility of a motorcycle during nighttime travel while not altering the original look of the motorcycle.

It is an another object of the present invention to provide additional lighting around the adjacent front and side area of a motorcycle to improve the rider's vision during night travel to allow for smoother and safer operation of the motorcycle.

It is yet another object of the present invention to provide additional safety to a motorcyclist during nighttime travel.

It is a further object of the present invention to reduce the number of motorcycle related accidents.

It is still another object of the present invention to increase the aesthetic beauty of a motorcycle.

It is even still a further object of the present invention to provide additional lighting on a motorcycle.

Other objects and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

The invention may be better understood by reference to the drawings in which.

DETAILED DESCRIPTION OF THE INVENTION

Figure 1:
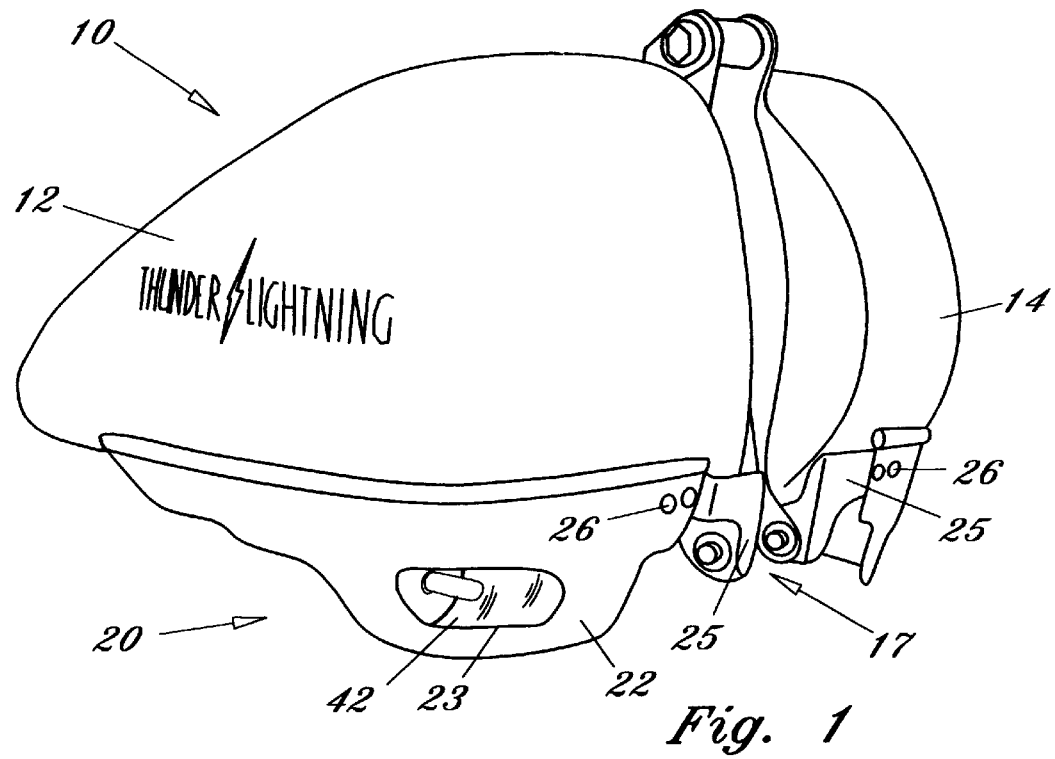
FIG. 1 is a perspective view of a first embodiment of the present invention attached to a conventional motorcycle gasoline tank.
Figure 2:
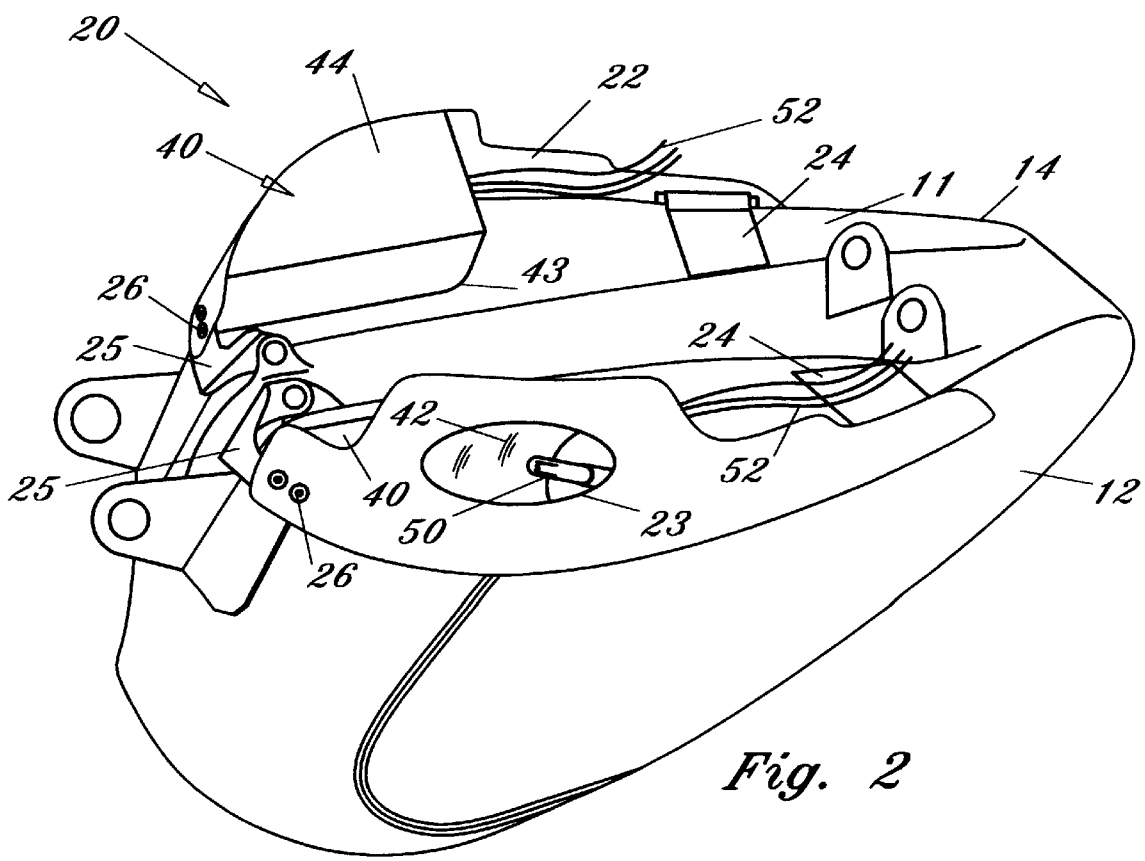
FIG. 2 is a perspective bottom view of the first embodiment of the present invention attached to a conventional motorcycle gasoline tank.
Figure 3:
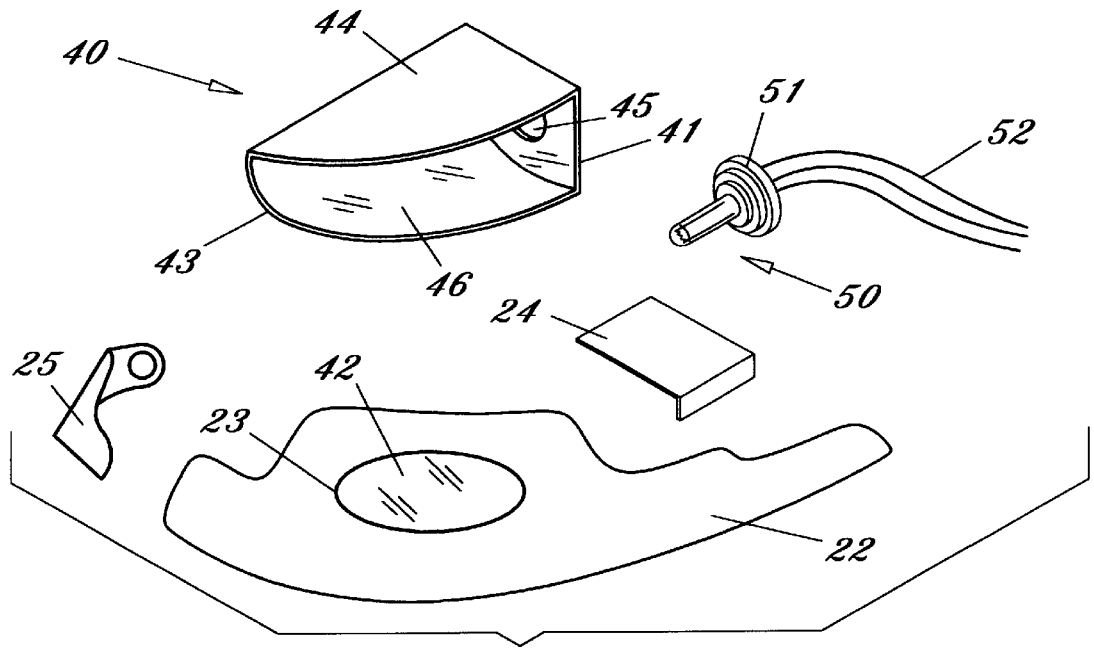
FIG. 3 is isometric exploded view of the first embodiment of the present invention.
Figure 5:
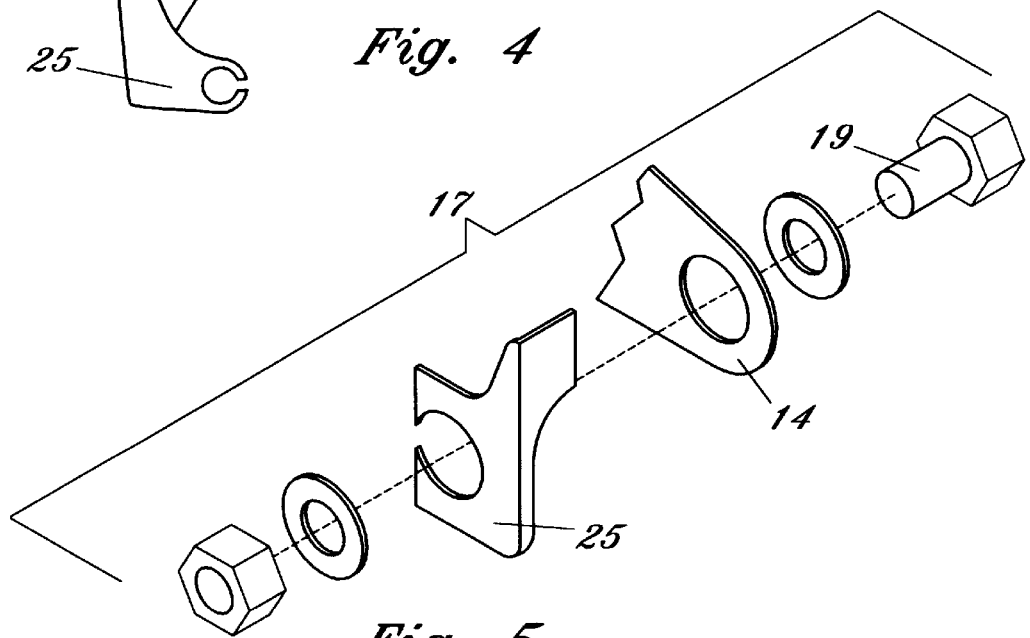
FIG. 5 is an exploded view of one attachment embodiment for the first and/or second embodiments of the present invention.
Figure 7:
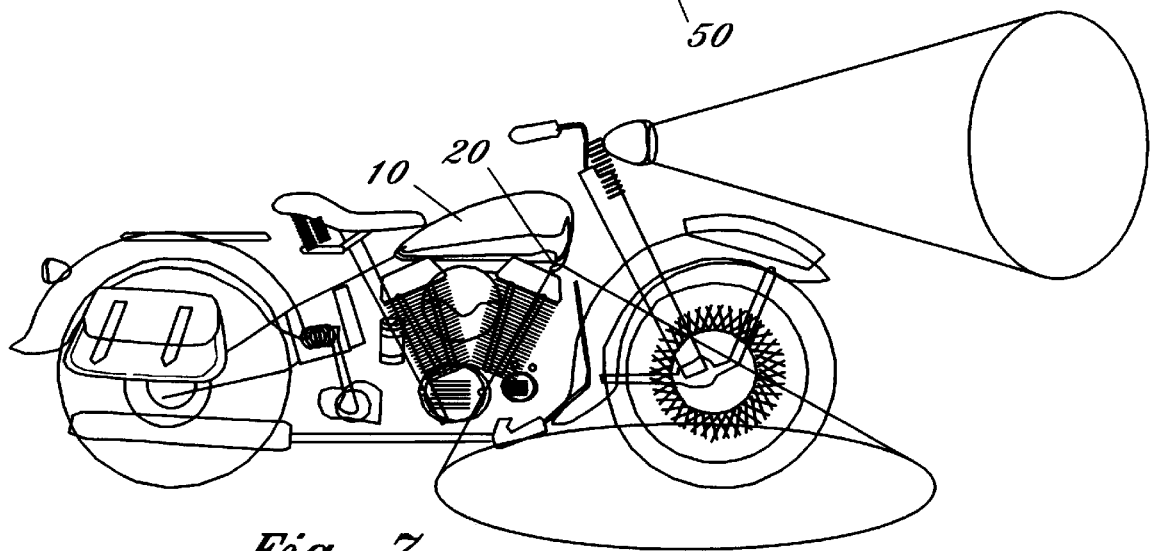
FIG. 7 is a side view of a conventional motorcycle illustrating the additional illumination provided by any of the embodiments shown in FIGS. 1–6.

The first embodiment of the present invention is shown in FIGS. 1–3. As seen in FIG. 1 a split gasoline tank 10 is generally shown as having a left side tank 14 and a right side tank 12 removably connected to the motorcycle frame 16 by a series of bolt/washer/nut combinations 17 (FIG. 5). Gasoline tank 10 is disposed between the seat and forks of a motorcycle (FIG. 7), typically at seat level.

Generally, the invention relates to providing one or more illumination devices adjacent gasoline tank 10 of a motorized two wheel vehicle, and preferably a motorcycle. Though gasoline tank 10 is shown as a split tank, it is to be understood that this is not limiting and it is within the scope of the present invention to utilize a single tank gasoline tank in replace of the split tank. Furthermore, the location of the gasoline tank on some brands of motorcycles is different than that described above. These motorcycles typically place the gasoline tank underneath the seat of the motorcycle and place a hollow shell resembling a gasoline tank between the seat and forks. Thus, it is also to be understood, that these hollow shells are also within the scope of the present invention. With these motorcycles, the illumination member is provided adjacent the shell. Accordingly, all references to a "tank" hereinafter shall also mean a hollow shell. Furthermore, though the present invention is illustrated in connection with a motorcycle, it should be understood that the present invention is not limited solely to use with two wheel motorcycles. The present invention can be used with other motorized two wheel vehicles, and such use is also considered within the scope of the invention.

In the first embodiment, an illumination device 20 is illustrated and generally includes a light panel 22 which is associated with a light housing 40. A light element 50 is connected within light housing 40. Wiring 52 extends from light element 50 to the existing circuitry, battery, turn signals, etc. of the motorcycle for powering the light element 50. Alternatively, an additional battery can be provided for powering the illumination member.

Light panel 22 is preferably attached to the motorcycle by at least one of the same frame bolts which attach the gas tank or shell to the motorcycle frame (FIG. 5). Preferably, light panel 22 is attached by at least one of such frame bolts 19 at its front end and at its back end by adhering to a portion of a bottom surface 11 of gasoline tank or shell 10. Depending on the motorcycle, one or more extension members 24 and/or 25 may be necessary to reach one or more of the bolt locations and/or a relevant portion of bottom surface 11 of the gasoline tank or shell 10. Light panel 22 can be constructed from many conventional materials, such as, fiberglass, chrome, aluminum, billet aluminum, carbon fiber, plastic, metal, steel, kevlar, wood, etc., which are all considered within the scope of the invention. Extension member 24 is preferably adhered to bottom surface 11, though other conventional connection methods are also within the scope of the present invention.

Figure 4:
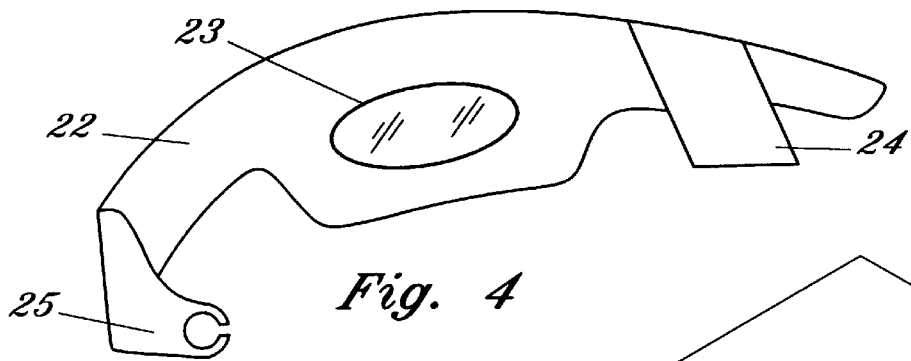
FIG. 4 is a perspective view of a second embodiment of the present invention.

All or some of the extension members 24 and/or 25 can be constructed integral with light panel 22 (FIG. 4) or light panel 22 can be attached to the extension member(s) 24 and/or 25 by conventional means 26 such as connectors, fasteners, rivets, bolts, screws, adhesives, tapes, hook and loop fasteners, etc.

Preferably, the contour of light panel 22 corresponds to the contour of gasoline tank or shell 10, such that when light panel 22 is attached it preferably appears as part or a continuation of the tank or shell. In lieu of attaching by the above-mentioned, the panel can be attached by other conventional methods such as adhesives, tapes, hook and loop fasteners, etc., as well as other bolts, screws, fasteners and connectors attached to other areas of the motorcycle.

Figure 6:
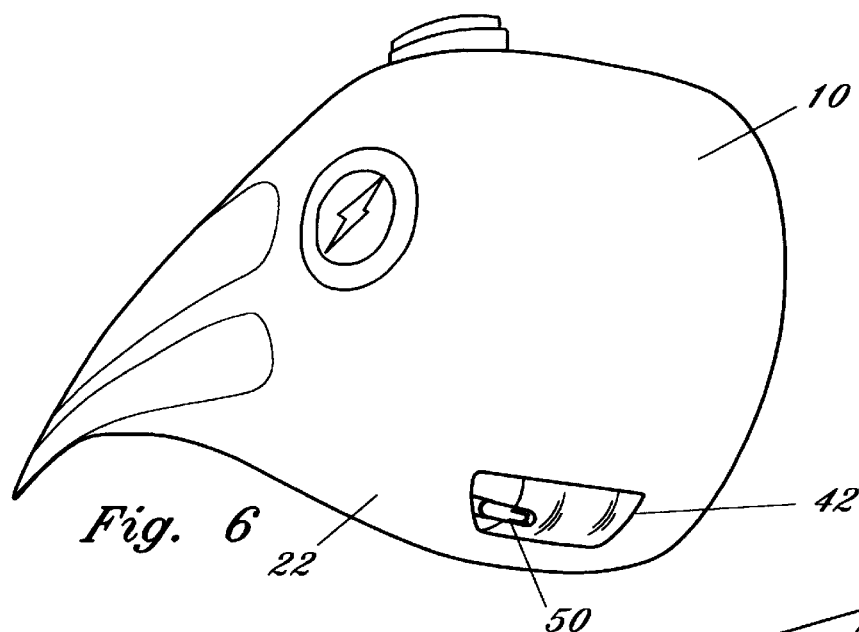
FIG. 6 is a perspective view of a third embodiment of the present invention shown constructed integral with a conventional motorcycle gasoline tank.

As seen in FIG. 6, the illumination member can also be constructed integral with the gasoline tank or shell. In this embodiment no extension member or fastening devices are needed, as the illumination member is part of the lower portion of the gasoline tank or shell.

Preferably, a portion of light panel 22 is provided with a cutout 23 or made transparent or otherwise light transmissive. Cutout 23 is disposed adjacent the portion of the panel where light housing 40 and associated light element 50 are disposed. Preferably, light housing 40 is attached to light panel 22 by conventional means, such as adhesives, tapes, clips, hook and loop fasteners, screws, bolts, fasteners, connectors, etc. Alternatively, light housing 40 can be attached directly to gasoline tank or shell 10 by similar conventional means.

A lens or other light transmissive material 42 is preferably attached to housing 40 and disposed within or adjacent cutout 23, when housing 40 is properly attached. Thus, light generated by light element 50 is reflected through panel 22 to illuminate a substantial portion of the area surrounding the motorcycle, as well as otherwise making the motorcycle more visible during nighttime travel. A portion of lens 42 can be differing in color then the remaining portion of the lens. The lens, cutout or other light transmissive area can be provided at any portion of light panel 22. Preferably, lens 42 is located towards the front of the panel or front side area of panel 22, when light panel 22 is properly attached to the motorcycle. It is also within the scope of the invention to provide more than one cutout or lens for each light panel 22.

When a plurality of cutouts or lenses are provided, a single illumination member (light housing and light bulb), sufficient enough to provide adequate light through all cutouts or lenses can be provided. Alternatively, each cutout or lens can be associated with its own corresponding illumination member. It is also within the scope of the invention, not to provide a lens. In this embodiment, the light will reflect through cutout 23.

Figure 8:
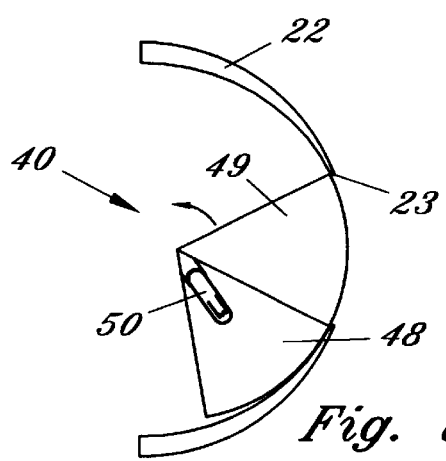
FIG. 8 is a sectional view of a servo light in a closed cover position.
Figure 9:
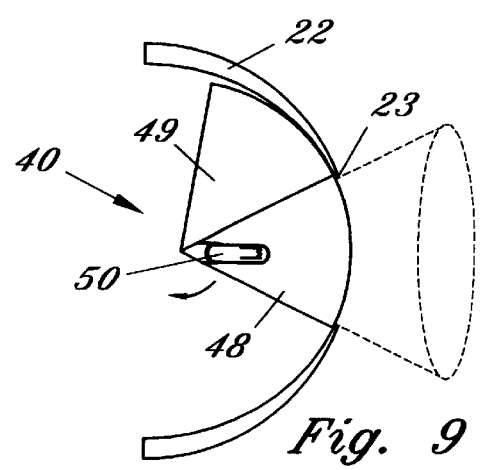
FIG. 9 is a sectional view of a servo light in an open light position.

In all embodiments, the illumination device can incorporate solid or flashing lights, and can be used as substitute turn signals. As seen in FIGS. 8 and 9, light housing 40 can include a light portion 48 and a cover portion 49 and acts similar to servo headlights found on automobiles, such as Chevrolet Corvettes. Light housing 40 can be operated automatically or manually. When light is desired the associated conventional servo motor (not shown) would rotate light housing 40, such that light portion 48, having lens 42 and light element 50, is adjacent cutout 23. When no light is desired the motor would rotate light housing 40, such that cover portion 49 is adjacent cutout 23. Preferably, cover portion 49 is similar in color to at least the area of light panel 22 adjacent cutout 23, so not to distract from the aesthetics of the motorcycle.

Preferably, to create a uniform look and to not destroy the aesthetics of the motorcycle, if one illumination device 20 is provided on one side of the motorcycle in accordance with the present invention, than another illumination device 20 should be provided on the other side of the motorcycle However, the invention is not limited to such arrangement, and it is within the scope of the present invention to provide only a single illumination device 20.

Illumination is provided by light element 50. Wires 52 are attached at one end to light element 50 and light socket 51 and are attached at their opposite end to the motorcycle battery (not shown) or other electrical circuits of the motorcycle according to the pattern of light desired, i.e. continuously on, flashing, wired to flash in conjunction with turning, etc.

Housing 40 includes a body member 44 having reflective means, such as foil or other glossy or shiny surfaces, along a portion of its inner surface 46. Preferably, the reflective means is provided along a substantial portion, if not all, of inner surface 46 of the body member 44. Transparent member or lens 42, preferably constructed from glass or plastic, can be attached to body member 44. However, other materials for transparent member 42 may be utilized and are within the scope of the invention. Body member 44 includes an aperture 45 for receipt of light element 50 and its corresponding light socket 51. Light element 50 and light socket 51 can be attached to body member 44 by conventional means, such as clips, adhesive, brackets, hook and loop fasteners, etc., and all are considered within the scope of the present invention.

Where housing 40 is attached to light panel 22, as opposed to the gasoline tank, it is preferably shaped to match the shape of the portion of panel 22 to which it will be attached Additionally, where lens 42 is inserted within cutout 23 or attached to housing 40 and positioned within or adjacent to cutout 23, it is preferably shaped to match the shape of cutout 23.

At least a portion of housing 40 can be slightly curved at 43 for aiding in angling reflected light from light element 50 downward to the adjacent side surrounding area of the motorcycle. Reflective inner surface 46 reflects light received from light element 50 through transparent member 42 to illuminate its corresponding side and front areas adjacent the motorcycle (FIG. 7) to allow the rider to have better familiarity with the surroundings during nighttime travel. Where an illumination device 20 is provided on both sides of the motorcycle, they together light at least a substantial portion of the side and front areas of the motorcycle and the surrounding area adjacent thereto, while also highlighting the chrome of the motorcycle engine to provide additional visibility of the motorcycle for safety purposes.

As stated above, wires 52 are attached at one end to light socket 51 and at the other end to the motorcycle circuitry (not shown) to provide power to light element 50. Alternatively, light element 50 may be powered by other conventional means including, but not limited to, a wheel generator or battery means, such as a 9 volt battery (not shown), to eliminate the need for the wires 52, as well as aperture 45.

Light element 50 is preferably a light bulb, and include any one of the following: low temperature bulbs, low voltage bulbs, fluorescent bulbs, halogen bulbs, neon lights, candescent bulbs, etc., all of which are considered within the scope of the invention. Furthermore, it is to be understood that other illumination devices can be disposed within housing 40 or attached to panel 22 to illuminate the side and front areas adjacent the motorcycle.

Transparent member or lens 42 can be removably attached to body member 44 to allow for replacement of light element 50. Alternatively, transparent member 42 is permanently attached to body member 44, and the entire light housing 40 is replaced once light element 50 has burned out. As a further alternative, the back wall 41 of body member 44 can be removed to provide access for replacing light element 50.

Lighting element 50 may be wired to be on while the motorcycle engine is turned on, or can be wired to be on only in certain situations, such as wiring to the turn signal circuitry. When on, illumination device 20 provides the motorcycle with a wider image or appearance to help other drivers see the motorcycle during nighttime travel, while also improving the motorcyclist's visibility of the adjacent surroundings also during nighttime travel, both resulting in increased safety to the motorcyclists, as well as other drivers an civilians.

Figure 10:
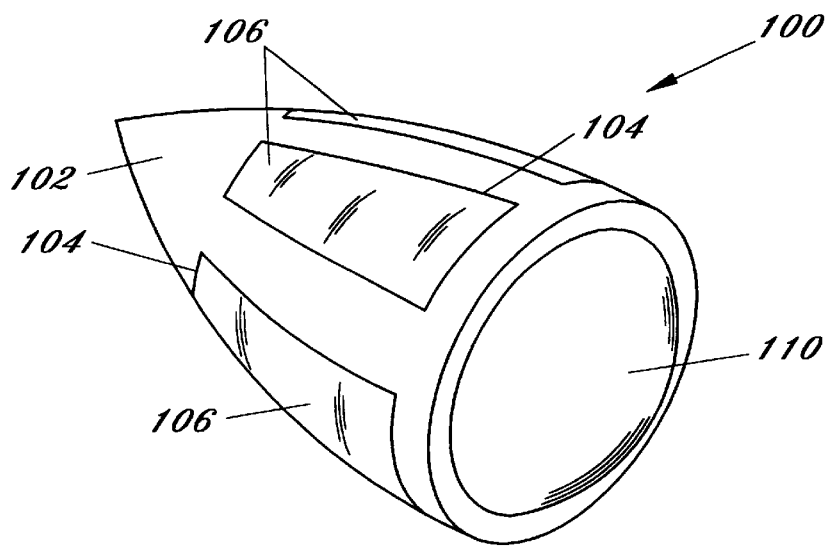
FIG. 10 is a side view illustrating the headlight embodiment of the present invention.
Figure 11:
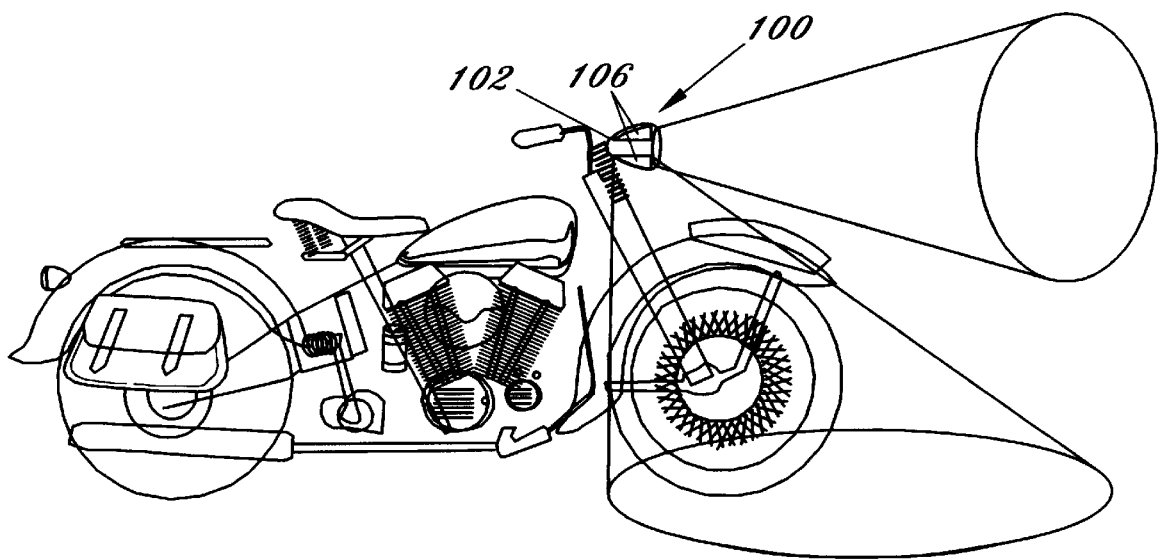
FIG. 11 is a side view of a conventional motorcycle illustrating the additional illumination provided by the headlight embodiments of the present invention.

FIGS. 10 and 11 illustrate the headlight embodiment of the present invention which is generally designated as headlight 100. Headlight 100 includes a body member 102 having at least one or more cutouts 104. The inner surface of body member 102 can be provided with reflective means, such as foil, shinny or glossy surface, etc. to reflect light generated by an attached conventional light bulb 110 in various directions. As cutout 104 are provided in body member 102, some of the reflected light will travel downwards through cutouts 104 (or lenses 106 discussed below) to illuminate the adjacent front surroundings to provide the rider with a better information as to what he or she is about to travel over during nighttime travels (FIG. 11).

Transparent or otherwise light transmissive lenses 106 can be disposed in corresponding cutouts 104. Lenses 106 are similar to lens 42 discussed above and are attached by conventional means such as adhesives, clips, etc. to body member 102 If wired properly and/or with the use of additional lighting elements, in accordance with the teachings of the present invention, some or all of the lenses 106 can be used as turn signals for the motorcycle Top lenses 106 can be of a different color than bottom lenses 106, especially if top lenses 106 are being used as turn signals. Alternatively, bottom lenses 106 can be of a different color than top lenses 106, where bottom lenses 106 are being used as turn signals.

Traditional motorcycle headlights merely illuminate a small area approximately twenty feet ahead of the motorcycle. The present invention, while still providing the traditional lighting, provides for an enlarged illuminated area which in addition to increasing the visibility of the rider during nighttime travel, also increases the visible of the motorcycle itself to drivers of cars, motorcycles, trucks, and other vehicles who may be sharing the road with the motorcyclist. The present invention headlight can also be used with non-motorized vehicles such as bicycles and tricycles, and such use is also within the scope of the invention.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What I claim is:

1. An illumination device for a motorized two wheel vehicle's gasoline tank, to provide light to an adjacent side and front ground area to help aid in the visibility of the two wheel vehicle while also improving the visibility of the surroundings to a rider while he or she is riding the two wheel vehicle, the gasoline tank having a bottom surface portion, said illumination device comprising:

a light panel connected to the vehicle adjacent said gasoline tank, said light panel having a light transmissive area; and an illumination member attached to said light panel and disposed such that at least some light generated by said illumination member is transmitted through said light transmissive area of said light panel.

2. The illumination device of claim 1 wherein said light transmissive area includes a cutout in said light panel.

3. The illumination device of claim 2 wherein light transmissive area comprises a cutout in said light panel and a lens disposed within said cutout.

4. The illumination device of claim 1 wherein said illumination member includes a light housing and light element.

5. The illumination device of claim 4 wherein said illumination member further including a transparent lens attached to said light housing; wherein said lens is disposed adjacent to said light transmissive area when said illumination member is properly attached.

6. The illumination device of claim 4 wherein said light housing having a reflective inner surface; wherein said light element provides light which is reflected by the inner surface of said light housing through said light transmissive area of said light panel to illuminate at least a portion of the adjacent side area of the motorized two wheel vehicle.

7. The illumination device of claim 4 wherein said light element is a light bulb and any required circuitry or wiring.

8. The illumination device of claim 4 wherein light housing includes an open light portion and a closed cover portion; wherein when it is desired to provide illumination through said light transmissive area said open light portion is adjacent said light transmissive area and when light is not desired said closed cover portion is adjacent said light transmissive area.

9. The illumination device of claim 1 further including an extension member having a first end and a second end, said extension member associated with said light panel.

10. The illumination device of claim 9 wherein the first end of said extension member is attached to a first end of said light panel and said second end of said extension member is attached to the two wheel vehicle by a bolt which also attaches a front end of the gasoline tank to the two wheel vehicle.

11. The illumination device of claim 10 wherein said extension member is constructed integral with said light panel.

12. The illumination device of claim 9 wherein the first end of said extension member is attached approximate to a back end of said light panel and is attached to the bottom surface of said gasoline tank.

13. The illumination device of claim 1 wherein said light panel is constructed integral with said gasoline tank.

14. The illumination device of claim 1 wherein a substantial portion of said light panel is shaped to correspond to a shape of the gasoline tank.

15. The illumination device of claim 1 wherein said light panel is constructed from a rigid material.

16. An illumination device for a motorized two wheel vehicle's gasoline tank, to provide light to an adjacent side and front ground area to help aid in the visibility of the two wheel vehicle while also improving the visibility of the surroundings to a rider while he or she is riding the two wheel vehicle, the gasoline tank having a bottom surface portion, said illumination device comprising:

a light panel connected to the vehicle adjacent said gasoline tank, said light panel having a cutout; and a light housing attached to said light panel, said light housing including a body member having a reflective inner surface and a transparent lens attached to said body member, said lens disposed adjacent said cutout when said light housing is properly attached to said light panel; and a light element disposed within said light housing;

wherein said light element provides light which is reflected by the inner surface of said light housing body member through said lens and cutout to illuminate at least a portion of the adjacent side area of the motorized two wheel vehicle.

17. The illumination device of claim 16 further including an extension member having a first end and a second end, said extension member associated with said light panel.

18. The illumination device of claim 17 wherein the first end of said extension member is attached to a first end of said light panel and said second end of said extension member is attached to the two wheel vehicle by a bolt which also attaches a front end of the gasoline tank to the two wheel vehicle.

19. The illumination device of claim 17 wherein said extension member is constructed integral with said light panel.

20. The illumination device of claim 17 wherein the first end of said extension member is attached approximate to a back end of said light panel and is attached to the bottom surface of said gasoline tank.

21. The illumination device of claim 16 wherein said light panel is constructed integral with said gasoline tank.

22. The illumination device of claim 16 wherein said light element is a light bulb and any required circuitry or wiring.

23. The illumination device of claim 16, wherein a portion of said body member is curved shaped.

24. A front headlight for a wheeled vehicle, said wheeled vehicle having a handlebar area, said headlight comprising:

a body member having at least one cutout, said body member connected to the wheeled vehicle approximate to the handlebar area of the wheeled vehicle;

a light element attached to said body member such that a portion of said light illuminates an area in front of the wheeled vehicle and a portion of said light is directed downward through said cutout to illuminate at least an adjacent external surrounding area.

25. The headlight of claim 24 wherein at least a portion of said body member provided with a reflective inner surface for directing said portion of light downward through said cutout.

* * * * *